June 9, 1925.

J. N. TRAHAN 1,540,964

ELECTRIC IMMERSION HEATER

Filed May 16, 1924

Inventor
Joseph N. Trahan
By William C. Sinton
Attorney

Patented June 9, 1925.

1,540,964

UNITED STATES PATENT OFFICE.

JOSEPH NAPOLEON TRAHAN, OF QUEBEC, QUEBEC, CANADA.

ELECTRIC IMMERSION HEATER.

Application filed May 16, 1924. Serial No. 713,805.

*To all whom it may concern:*

Be it known that I, JOSEPH NAPOLEON TRAHAN, subject of the King of Great Britain, residing at Quebec, in the Province of Quebec, Canada, have invented certain new and useful Improvements in Electric Immersion Heaters; and I do hereby declare that the following is a full, clear, and exact description of the invention, such as will enable others skilled in the art to which it appertains to make and use the same.

The present invention pertains to an automatic heater of the immersion type, adapted to be immersed in a body of liquid for heating the same.

The principal object of the invention is the provision of a device of this character of simple construction and efficient in operation. The device comprises a box like casing, the walls of which are slotted for the entrance of water therein. Within the casing is disposed a pair of spaced plates around which is wound a resistance wire. These plates are perforated so that the water within the casing may surround the resistance wire and thus become heated.

The plates are held spaced apart by means of a number of bolts passed therethrough. Simplicity of construction is attained by connecting the ends of the wire to two of these bolts and then joining the ends of the current supplying conductors to the same bolts.

The cover of the casing is preferably hinged in order that access to the interior may be obtained. On the top of the cover is formed a tube for enclosing the conductors and protecting them from the liquid in which the device is placed when in use.

The invention is fully disclosed in the following description and in the accompanying drawings in which.

Figure 1:
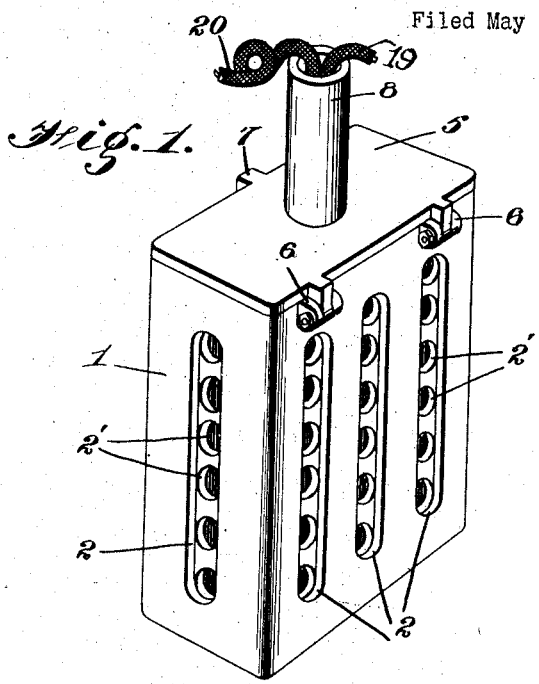
Figure 1 is a perspective view of the device.
Figure 3:
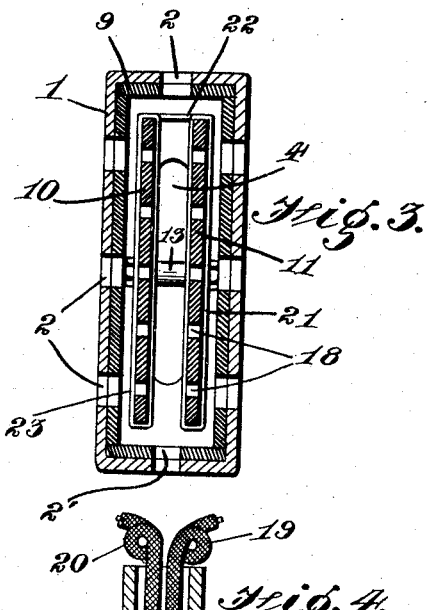
Figure 3 is a section on the line 3—3 of Figure 2.
Figure 2:
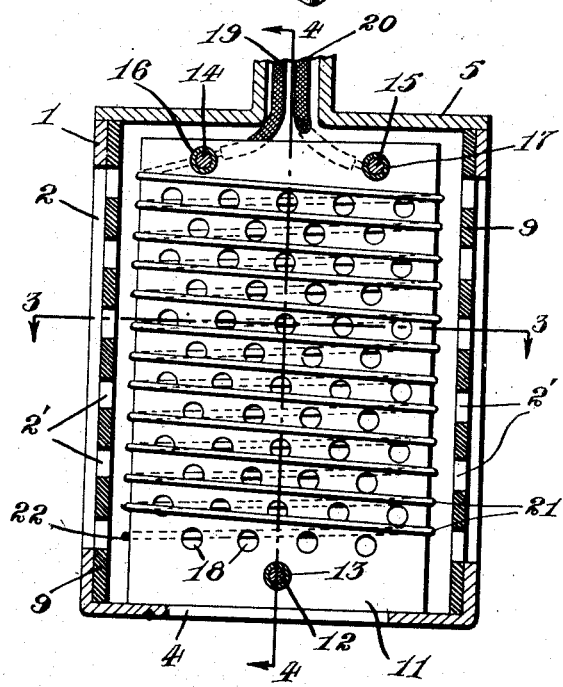
Figure 2 is a longitudinal vertical section thereof.
Figure 4:
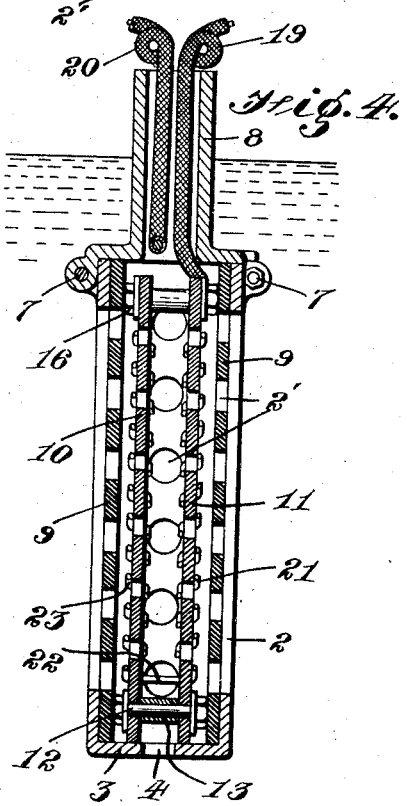
Figure 4 is a section on the line 4—4 of Figure 2.

The device comprises a box like housing 1 formed of any suitable material, preferably metal. The lateral walls or sides are slotted vertically as at 2. The bottom 3 is also formed with a longitudinal slot 4, as shown in Figures 2 and 4. The top of the casing is open and is equipped with a cover 5 hinged as at 6 to one of the side walls and adapted to be attached to the opposite side wall by means of a catch 7. A tube 8 is formed with the cover for a purpose which will presently appear.

The side walls of the casing 1 are lined with an insulating material 9, preferably mica. This material is perforated as at 2' in registration with the slots 2. Within the casing are placed a pair of mica plates 10 and 11 spaced from the lining 9 and also from each other. Those plates are held apart by means of a single bolt 12 near the lower edges thereof, an insulating sleeve 13 surrounding this bolt in the space between the plates. A pair of similar bolts 14 and 15 are passed through the plates 10 and 11 near the upper edges thereof, these members being surrounded by insulating sleeves 16 and 17 in the space between the plates.

The plates are formed each with a plurality of perforations 18. A pair of conductors 19 and 20 are passed through the tube 8, these members being secured to the spacing bolts 14 and 15 respectively, as shown in Figure 2. From the bolt 14, a coil of resistance wire 21 is wound around the plates 11 to the lower edge thereof. It is then extended across the space between the plates 10 and 11 as shown by the numeral 22, and is wound upwardly as at 23 upon the plate 10. The end thereof is joined to the bolt 15, whereby a series circuit is completed between the conductors 19 and 20. Obviously, current is supplied to these conductors and consequently to the coil from any suitable source.

In use, the device is lowered into the liquid to be heated, as illustrated in Figure 4. The liquid is free to flow throughout the device by way of the slots 2 and 4 and perforations 2' and 18. In this manner, the conducting wire 21, 22 and 23 is entirely surrounded by water, and the latter becomes heated due to the heat of resistance developed in the wire.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. An immersion heater comprising a casing having slotted walls, a pair of insulation plates disposed in spaced relation within said casing and spaced from the walls thereof, said plates being adapted for the passage of water therethrough, resistance wire wound around said plates, and means for supplying current to said wire.

2. An immersion heater comprising a casing having slotted walls, a pair of insulation plates disposed in spaced relation within said casing and spaced from the walls thereof, said plates being adapted for the passage of water therethrough, resistance wire wound around said plates, a tube formed on the top of said casing, and conductors spaced through said tube and connected to said resistance wire.

3. An immersion heater comprising a casing having slotted walls, a pair of insulation plates supported therein in spaced relation from the walls of the casing, said plates being adapted for the passage of water therethrough, bolts passed through said plates for holding them in spaced relation, a resistance wire wound around said plates and having its ends connected to two of said bolts, a tube formed on the top of said casing, and a pair of conductors passed through said tube and having their ends connected to said two bolts, the side walls of the casing being provided with an insulating lining perforated in registration with the slots of said walls.

In witness whereof I have hereunto set my hand.

JOSEPH NAPOLEON TRAHAN.